April 25, 1939. E. J. THURBER 2,156,209
GEAR CHANGING DEVICE
Filed Feb. 25, 1936 3 Sheets-Sheet 2
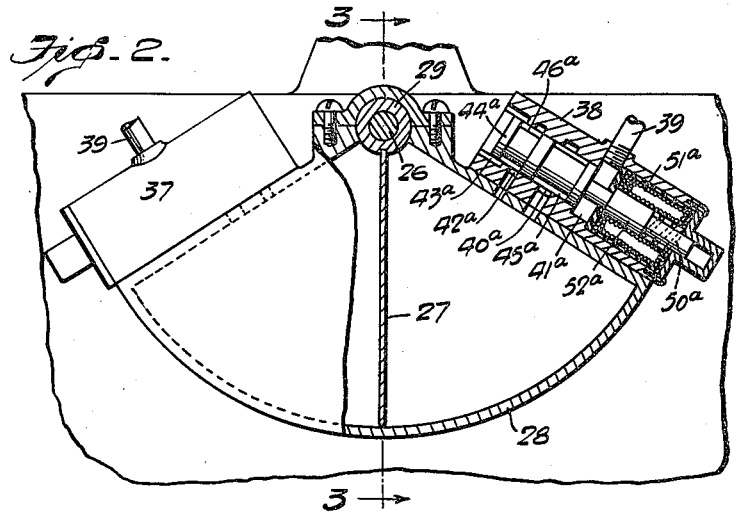
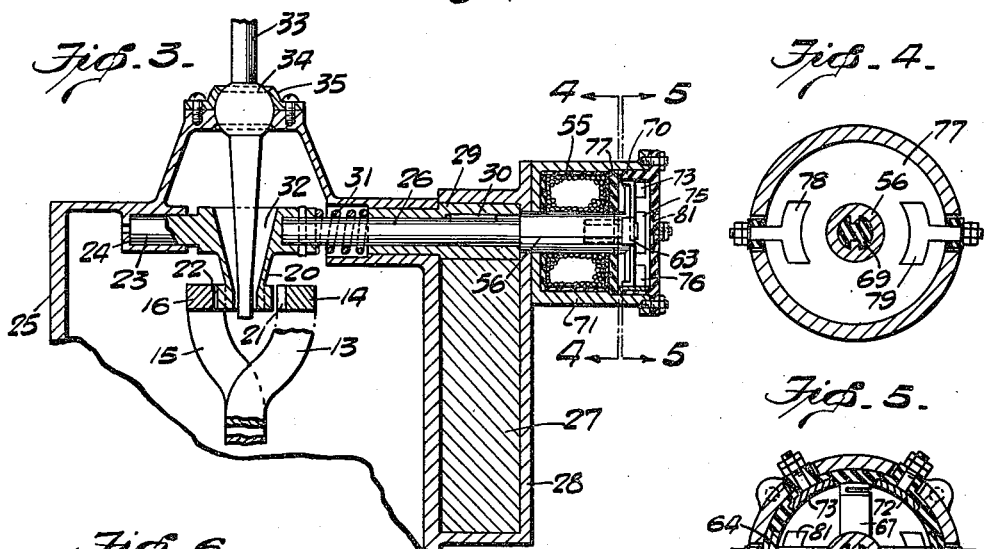
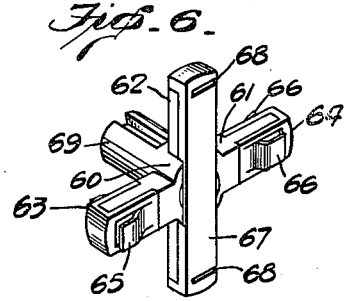
Inventor
Edward J. Thurber
By Nason & Bateman
Attorneys April 25, 1939.　　　　E. J. THURBER　　　　2,156,209
GEAR CHANGING DEVICE
Filed Feb. 25, 1936　　　3 Sheets-Sheet 3
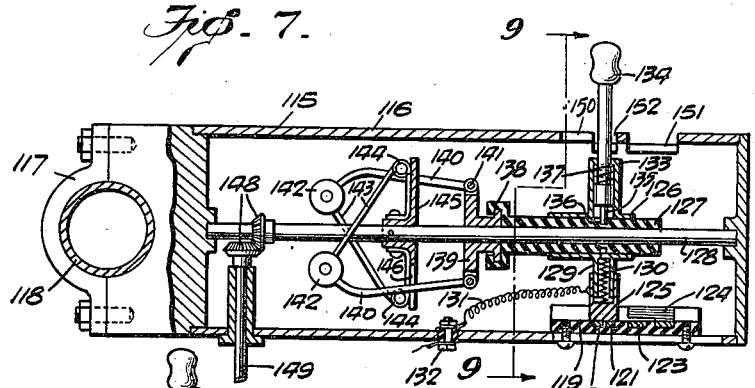

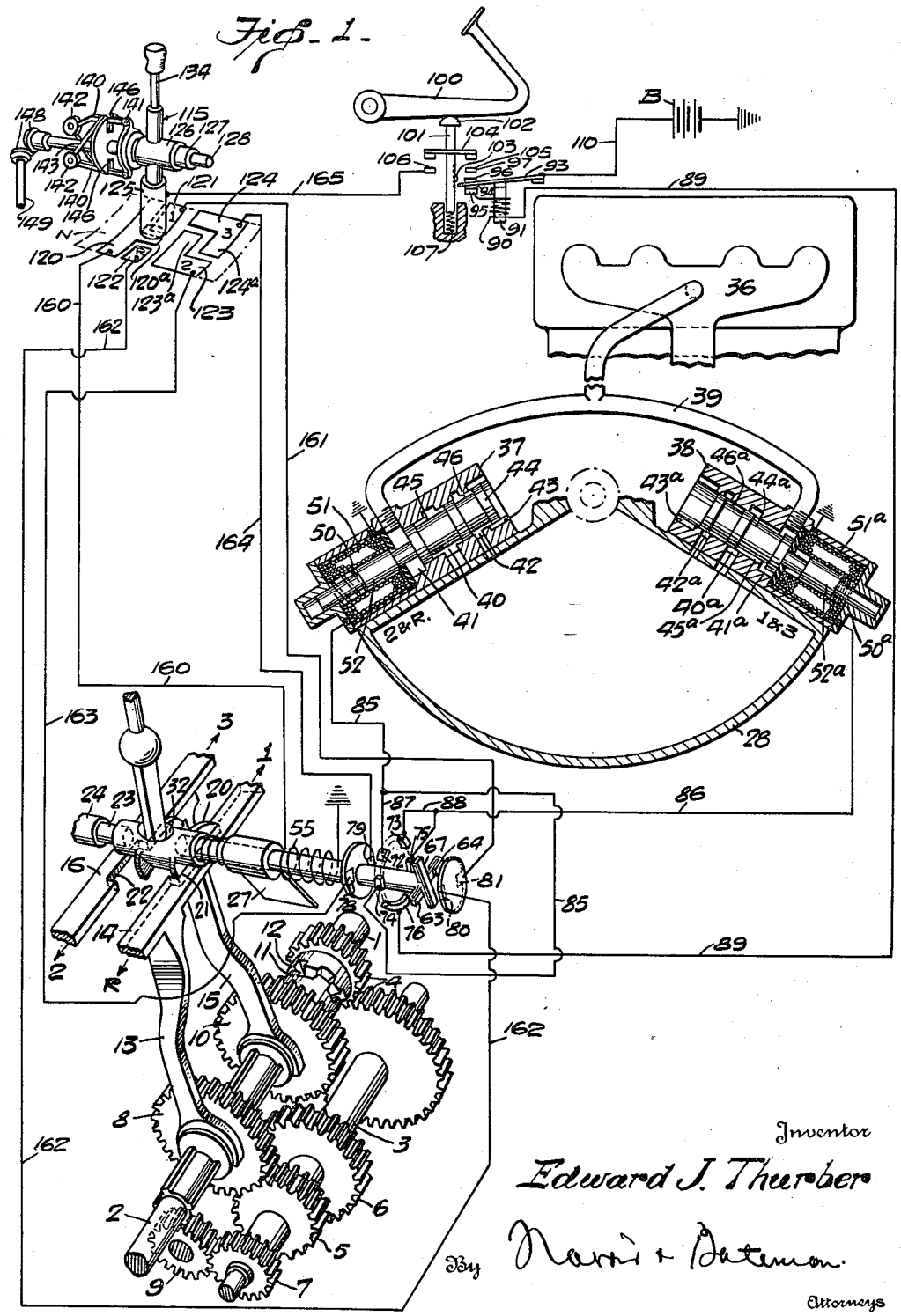

Patented Apr. 25, 1939

2,156,209

UNITED STATES PATENT OFFICE 2,156,209

GEAR CHANGING DEVICE

Edward J. Thurber, New Orleans, La., assignor of one-half to Ralph K. Rothrock, New Orleans, La.

Application February 25, 1936, Serial No. 65,714

43 Claims. (Cl. 74—336.5)

The present invention relates to improvements in gear changing devices, and more especially to variable speed automotive transmission mechanisms, and the invention relates more particularly to means for shifting or setting the gear changing elements thereof to effect different desired gear changes.

One of the primary objects of the invention is to provide novel and improved control means for such gear changing devices whereby the different speed changes may be made automatically in accordance with the speed of the automobile, or may be made manually or selectively at the will of the driver, means being provided which insures return of any gear changing element from operative position to neutral or inoperative position before the device is set for another speed.

Another object is to provide control means for such gear changing devices which embodies a speed responsive device capable of making the different speed changes automatically according to speed, and means operative manually either by disconnecting it from the speed responsive device or by restricting the operation of the speed responsive device, and enabling the driver to set the gear changing device for one or another speed selectively, as desired, independently of the speed responsive device.

Another object is to provide a control device, operative at the will of the driver, to determine when the speed change shall be made, such control device embodying means which insures return of the gear changing mechanism to neutral condition before it can be set for another speed, thereby providing, in effect, an interlock which precludes the possibility of clashing of the gear changing elements of the mechanism.

Another object of the invention is to provide a shifting mechanism for the gear changing elements which combines as a unit therewith neutralizing means which insures the return of the shifting mechanism to neutral condition, and shifting means cooperative with the neutralizing means to cordinate the neutralizing and gear changing operations.

To these and other ends the invention consists in certain improvements and combinations and arrangements of parts all as will be hereinafter more fully described, the features of novelty being pointed out particularly in the claims at the end of this specification.

In the accompanying drawings:

Figure 1 is a diagrammatic view of a speed or gear changing device embodying the present invention;

Figure 2 is a detail view, partly in section, of a portion of an automobile transmission mechanism, showing fluid pressure operated means for operating the actuating member to effect the different gear changes;

Figure 3 is a vertical section taken on the line 3—3 in Fig. 2;

Figure 4 is a vertical section, on an enlarged scale, taken on the line 4—4 in Fig. 3 and looking in the direction of the arrows;

Figure 5 is a vertical section on an enlarged scale taken on the line 5—5 in Fig. 3 and looking in the direction of the arrows;

Figure 6 is a detail perspective view of the controlling contact member which is governed to move in accordance with the movements of the actuating member;

Figure 7 is a detail view, partly in section, of the switch by which the different gear changes are selected;

Figure 8 is a top plan view of a portion of the switch shown in Figure 7;

Figure 9 is a cross section through the selecting switch, taken on the line 9—9 in Fig. 7;

Figure 10 is a vertical section through the switch which controls the restoring of the gear elements to neutral condition, and thereafter effects the different gear changes; and Figure 11 is a detail sectional view of a modified structure.

Similar parts are designated by the same reference characters in the several figures.

Gear changing devices embodying the present invention are applicable generally to changeable speed or changeable gear mechanisms of various kinds to facilitate the setting thereof for different speeds or gear changes, and the invention is applicable more particularly to automobile transmission mechanisms of conventional forms employing a pair of reciprocatory shifting bars connected respectively to the sliding gears or gear changing elements of the mechanism, each of these bars being usually slidable from a normal or neutral position in either direction to effect one or another gear change. The preferred embodiments of the invention are shown in the accompanying drawings and will be hereinafter described in detail, but it is to be understood that the invention is not restricted to the precise constructions and arrangements shown since equivalent constructions and arrangements are contemplated and such will be included within the scope of the claims.

In the accompanying drawings, the invention is shown applied to an automobile transmission mechanism of conventional form comprising the usual main drive or clutch shaft 1 driven as usual through the usual clutch from the automobile engine, 2 represents the usual main shaft of the transmission mechanism which is connected at its rear end as usual to the rear or driving wheels of the automobile, 3 represents the usual countershaft of the transmission mechanism, it being driven from the clutch shaft 1 by gears 4 as usual and having first, second and reverse gears 5, 6, and 7 fixed thereon, the main transmission shaft 2 having a sliding gear 8 splined thereon and shiftable from its normal or neutral position into mesh either with the first speed gear 5 or with the usual idler reverse gear 9 meshing with the reverse gear 7 on the countershaft, and the main shaft 2 also has a sliding gear 10 splined thereon and shiftable in one or the other direction from its normal neutral position to engage it with the second speed gear 6 or to engage a clutch member 11 fixed thereon with a clutch member 12 fixed to the clutch shaft 1 to set the transmission mechanism for third or high speed drive. The sliding gear 8 which sets the transmission mechanism for first or reverse gear is engaged by a shifting fork 13 fixed to a reciprocatory shifting bar 14 which is mounted to reciprocate in the transmission casing as usual, and the second and third speed gear 10 is engaged by a shifting fork 15 which is fixed to a shifting bar 16 which is mounted to reciprocate in the transmission casing. The transmission mechanism shown is of a well-known conventional form and is given by way of an example of a changeable speed of gear changing mechanism to which the present invention is applicable.

The reciprocatory gear shifting bars are actuated by an actuating member 20 which, according to the present invention, is shiftable laterally to operatively engage it either in a notch 21 in the inner side of the shifting bar 14 or a notch 22 in the inner side of the shifting bar 16, and the actuating member is rockable or reciprocatory at its lower end to shift the shifting bar with which it is engaged, in one direction or the other to effect the different gear changes. As shown in the present instance, the actuating member is provided at one side with a shaft 23 which is rotatable and also shiftable axially in a bearing 24 provided in the upper portion of the transmission casing 25, and the actuating member has another shaft 26 fixed thereto and extending from its opposite side in alinement with the shaft 23, the shaft 26 serving to operate the actuating member. Preferably and as shown in the present instance, the actuating member is rocked on its pivotal axis or reciprocated to effect the different gear changes by fluid pressure means, such means shown in the present instance comprising a piston 27 in the form of a vane which is fitted to swing in an arcuate path within an arcuate fluid pressure chamber 28 formed on or attached to a side of the transmission casing, the vane having a hub 29 to which it is fixed, the hub of the vane being fitted over the shaft 26 concentrically therewith and being splined to said shaft by a key 30 whereby the swing of the vane in either direction will cause the shaft 26 to rotate in the corresponding direction, and the shaft 26 may be shifted axially within the hub of the vane, to connect the actuating member 20 with one or the other of the shifting bars while maintaining an operating connection between the actuating member and its operating vane 27. Preferably, the actuating member 20 is normally held yieldingly in operating relation with the shifting bar 16 which sets the transmission mechanism for second and third speeds, a coiled compression spring 31 being provided for this purpose which encircles the shaft 26 and bears at one end against the hub 29 and at its other end against the actuating member, this spring however being compressible to permit the actuating member to be shifted out of operating relation with the shifting bar 16 and engaged with the shifting bar 14. The actuating member is preferably formed with a tapered or upwardly flared socket 32 into which the lower end of the usual hand shifting lever 33 may be inserted, when shifting of the gears manually is desired, the hand shifting lever being provided as usual with a ball 34 which may be mounted to rock longitudinally and transversely in a socket 35 provided on the top of the transmission casing.

The vane 27 is caused to swing from the neutral position shown in Figure 2, in either direction toward one or the other end of the casing 28 by creating a difference in fluid pressure in the casing at opposite sides of the vane. Preferably the vacuum pressure available in the intake manifold 36 of an automobile engine is utilized conveniently to effect the operations of the vane, communication of the one or the other side of the vane with the intake manifold being controlled by a pair of valves 37 and 38, these valves being connected to the intake manifold by a pipe 39. These valves may be of any suitable construction, those shown each comprising ports 40 and 40$^a$ which communicate with the respective ends of the vane casing 28, ports 41, 41$^a$ which communicate with the pipe 39, ports 42 and 42$^a$ which communicate with the respective ends of the vane casing, and ports 43 and 43$^a$ which communicate with the atmosphere. These valves also each embody a valve piston or plunger 44 or 44$^a$ fitted to reciprocate axially, each piston or plunger having a groove 45 or 45$^a$ and a groove 46 or 46$^a$. These ports and grooves of these valves and their pistons are so located that when the valve piston is in one position the groove 45 or 45$^a$ will connect the ports 40 and 41 or 40$^a$ and 41$^a$, thus connecting the respective end of the vane casing 28 with the intake manifold to establish a vacuum pressure in the corresponding end of the vane casing and at the same time the port 42 or 42$^a$ will be closed to the atmospheric vent 43 or 43$^a$, and when the valve piston occupies another position, the valve piston will intercept communication between the ports 40 and 41 or 40$^a$ and 41$^a$ and will establish communication between the port 42 or 42$^a$ and the atmospheric vent 43 or 43$^a$. For example, as shown in Figure 1, the valve piston 44 is in a position to intercept communication between the vacuum ports 40 and 41 while the port 42 is in communication with the atmospheric vent port 43, and the valve piston 44$^a$ is in a position to establish communication between the vacuum ports 40$^a$ and 41$^a$ and to intercept communication between the port 42$^a$ and the atmospheric vent port 43$^a$. With the valves set as shown in Figure 1, a vacuum pressure will be established at the right hand end of the vane casing 28 and atmospheric pressure entering the left hand end of this vane casing will act to swing the vane 27 toward the right hand end of the casing 28 in this figure. Reversal of the positions of the valve pistons in the valves 37 and 38 will cause the vane to swing to or toward the left hand end of the vane casing.

The pistons 44 and 44ª of these valves are normally held in positions to interrupt communication between the respective ends of the vane casing and the intake manifold and to establish communication between both ends of the vane casing and the atmosphere, by compression springs 50 and 50ª, and solenoids 51 and 51ª are preferably provided for shifting the valve pistons to establish communication between one or the other end of the vane casing and the intake manifold, these solenoids cooperating with solenoid cores 52 and 52ª respectively which are carried by stems attached to the respective valve pistons, energizing of one or the other solenoid serving to shift the respective valve piston into the position shown for the valve 38 in Figure 1.

It will be understood that the swing of the vane 27 in one or the other direction under control of the valves 37 and 38 will swing or rock the actuating member 20 to effect corresponding reciprocation of the shifting bar 14 or 16 to which it is operatively connected. While the actuating member, as hereinbefore stated, is preferably connected normally to the second and third speed shifting bar 16 under the action of the spring 31, means is provided for disconnecting the actuating member from that shifting bar and connecting it to the shifting bar 14 so that the latter may be operated to set the transmission mechanism for first speed or reverse, and the means provided by the present invention for controlling the connection of the actuating member to one or the other shifting bar is electro-magnetically controlled. In the construction shown in Figures 1 and 3, a solenoid 55 is employed for this purpose, it cooperating with a solenoid core 56 which is carried by the shaft 26 and is coaxial therewith. By this arrangement, when the solenoid 55 is energized, the shaft 26 will be pulled axially from its normal position shown in Figure 3 toward the right in that figure, thereby withdrawing the actuating member 20 from engagement in the notch 22 in the shifting bar 16 and engaging the actuating member in the notch 21 in the shifting bar 14, assuming that the shifting bars 14 and 16 at this time are both in neutral position so that the notches 21 and 22 in their inner sides are directly opposite to one another. De-energization of the solenoid 55 will enable the spring 31 to return the actuating member 20 to its normal connected relation with the shifting bar 16.

The present invention provides a governing switch which is movable in accordance with the movements of the actuating member to control the restoration of each gear or gear changing element in the transmission mechanism to neutral position and to control the energization of the solenoids of the valves 37 and 38 to cause the actuating member to effect one or another gear change. This switch comprises a switch member 60 the body of which is composed of "Bakelite" or other suitable insulating material having a pair of cross-arms 61 and 62 thereon extending preferably in right-angular relation. The ends of the cross-arm 61 are provided with contacts 63 and 64 which are exposed at the ends and the two opposite sides of such cross-arm, the sides of these contacts being preferably provided with resilient or spring brushes 65 and 66, and the cross-arm 62 has a contact strip 67 extending from end to end thereof, this contact strip being exposed at the ends of this cross-arm and being preferably slotted as shown at 68 to render the ends of this contact member resilient or yieldable. The contact member 60 is formed with a central hub or stem 69 which is keyed or otherwise fixed in the outer end of the solenoid core 56 so that this contact member will rotate and also shift axially with the shaft 26. This contact member is fitted to rotate and also shift axially within a switch casing 70 which is composed of "Bakelite" or other insulating material and which may be removably secured to the outer end of a casing 71 which contains the solenoid 55. The switch casing 70 has a cylindrical portion projecting into the casing 71 and this cylindrical portion of the casing is provided with a series of circumferentially spaced contacts 72, 73, 74, 75, and 76, the contacts 72, 73 and 76 being engageable by the ends of the contact strip 67 when the contact 67 is rotated in one or the other direction, and the contacts 74 and 75 being engageable by the ends of the contacts 63 and 64. The inner end of the switch casing is closed by a disk 77 of suitable insulating material having a pair of contacts 78 and 79 fitted therein in diametrically opposite relation and adjacent to the contacts 74 and 75 respectively, and the outer end of the switch casing has a pair of contacts 80 and 81 fitted therein in diametrically opposite relation and adjacent to the contacts 74 and 75 respectively. When the switch member 60 occupies its normal position within the switch casing as shown in Fig. 3, the sides of the contacts 63 and 64 will engage the end contacts 78 and 79 and also the contacts 74 and 75, and when the switch member 60 is shifted axially, the contacts 63 and 64 will remain in engagement with the contacts 74 and 75 but the opposite sides of the contacts 63 and 64 will engage the end contacts 80 and 81 respectively. The ends of the contact 67 will be engageable with the contact 76 and the contact 72 or 73, irrespective of the axial position of the switch member 60 in the switch casing. The contacts 72 and 73 are so located with respect to the rotatable contact 67 that the latter will engage either the contact 72 or 73 when the vane 27 is at the end of its swing in one or the other direction, and the contact 67 will move out of engagement with one or the other of the contacts 72 and 73 and will engage the insulation between them when the vane 27 reaches its middle or neutral position. Also, the contacts 63 and 64 are so located that they will engage the contacts 74 and 75 while the vane 27 is in its middle or neutral position or at the end of its swing in either direction and the contacts 63 and 64 will engage the contacts 78 and 79 or 80 and 81, according to the axial position occupied by the controlling switch member 60.

The contact 74 is connected by a wire 85 to the solenoid 51 of the valve 37, the other terminal of this solenoid being grounded, and the contact 75 is connected by a wire 86 to the solenoid 51ª of the valve 38, the other terminal of this solenoid being grounded. The contact 72 is connected by a wire 87 to the solenoid 51 of the valve 37, and the contact 73 is connected by a wire 88 to the solenoid 51ª of the valve 38. The contact 76 is connected to a wire 89 which supplies current to the contact 72 or 73 to set the valves 37 and 38 to neutralize the device before a gear change is made.

The present invention provides means for insuring the return of any gear element to neutral position before a gear change is made. Such means comprises an electro-magnetic switch (Fig.

10) which comprises an electro-magnet 90 having a core 91 with which an armature 92 on a switch arm 93 cooperates, this switch arm having a contact 94 which is engageable with a contact 95 when the switch tongue 93 is attracted by energizing of the electro-magnet 90, and the switch arm 93 has a contact 96 at its opposite side which cooperates with a contact 97 when the switch arm 93 is retracted from the magnet core 91, as occurs when the electro-magnet 90 is de-energized, the switch arm 93 being composed of resilient material and having a tendency to normally retract from the electro-magnet and to hold the contacts 96 and 97 in engagement, as shown in Figure 10. The electro-magnet and switch arm just described are contained in a suitable casing 98 located in a suitable position on the automobile and having means for operating it at the will of the driver, it being preferably located in a position to be operated by the usual clutch pedal 100 which controls the engagement and disengagement of the usual clutch by which the transmission mechanism is coupled to the automobile engine, the arrangement being such that the switch just described will be actuated by the clutch pedal when the latter is operated to disengage the driving clutch. The switch is provided for this purpose with a plunger 101 which extends upwardly through the top of the casing 98 and is provided with a button 102 located beneath the clutch pedal so that it will be pushed downwardly thereby when the clutch pedal is moved into clutch disengaging position. The plunger 101 carries a spring or resilient dog 103 which is engageable with the switch arm 93, when the plunger is depressed, and operates to move the switch arm downwardly and thereby engage the contact 94 thereon with the contact 95, and the plunger carries a switch contact 104 which, after the plunger has been depressed to engage the contacts 94 and 95 will bridge a contact 105 connected to the contact 97 and a cooperating contact 106. After the plunger has been depressed sufficiently to bring the contacts 94 and 95 into engagemet, dog 143 will yield and pass the end of the switch arm 93, and further depression of the plunger brings the switch contact 104 into engagement with the contacts 105 and 106. The plunger is normally held yieldingly in its raised position by a spring 107.

As will be seen from Figure 1, the wire 89 from the contact 76 is connected to one terminal of the winding of the electro-magnet 90, the other terminal of this magnet being connected to the contact 95, and the switch arm 93 is connected by a wire 110 to one terminal of a source of electric current such as a storage battery B such as commonly carried on automobiles, the other terminal of this battery being grounded on the frame of the automobile, as usual. By this arrangement, whenever the clutch pedal 100 is operated to disengage the driving clutch, as occurs incidental to each gear changing operation, the switch arm 93 will be depressed and the circuit from the battery will be completed through the contacts 94 and 95 and the winding of the electro-magnet 90, to the contact 76, and the current thus supplied to the contact 76 will pass through the contact 67 to the contact 72 or 73, according to the position occupied by the vane 27, assuming that one of the gear changing elements of the transmission mechanism is in operative position, and the current thus supplied to the contact 72 or 73 will be conducted to the solenoid 51 or 51ᵃ of the valve 37 or 38 and the circuit therethrough completed by grounding as indicated in Fig. 1, and the consequent energizing of the solenoid of one or the other of these valves will establish communication between the casing 28 at one side of the vane and the intake manifold and the other valve will establish communication between this casing at the other side of the vane and the atmosphere, thus causing the vane to swing in the appropriate direction to its middle or neutral position, at which time the contact 67 will reach the insulation between the contacts 72 and 73 and thereby break the circuit just described and interrupt the swing of the vane, the movement of the vane to its middle and neutral position returning whichever gear shifting bar it happens to be connected to, to its middle or neutral position. Since the winding of the electro-magnet 90 is connected in the circuit just described, said electro-magnet will remain energized and hold the contacts 94 and 95 in engagement until the circuit through the conductor 89 is broken by the passing of the contact 67 out of engagement with the contact 72 or 73, whereupon the electro-magnet 90 becomes de-energized and the switch arm 93 springs upwardly, bringing the contact 96 thereon into engagement with the contact 97, which will then be engaged by the switch contact 104, so that a circuit will then be completed to effect the gear change. By fully releasing the clutch, contact 104 is returned to its normal raised position thereby breaking all the circuits connected to the shifting device.

The selecting of the different gear changes is accomplished by a selecting switch 115, the detail construction of which is shown in Figures 7, 8 and 9. The selecting switch provided by the present invention embodies a speed responsive device which is operative to set the switch to effect different gear changes automatically according to the speed of the automobile, and this switch is also capable of manual operation to enable different gear changes to be selected at the will of the operator, either by disconnecting the switch from the speed responsive device or by restraining the speed responsive device from acting upon the switch. As shown in the present instance, the selecting switch comprises a casing 116, which is preferably cylindrical in form and is provided at one end with a clamp 117 by which it may be secured in a suitable position upon the usual steering column 118 or upon any other desired part of an automobile. The switch casing contains a segmental block 119 of suitable insulating material on which are mounted a series of contacts 120, 121, 122, 123 and 124. The contacts 121 and 122 are located adjacent to the contact 120 and at opposite sides of an extension 120ᵃ which extends between the contacts 121 and 122, and the contacts 123 and 124 have extensions 123ᵃ and 124ᵃ which are arranged in overlapping relation spaced longitudinally of the switch. This switch also comprises a controlling contact 125 which is shiftable longitudinally of the switch along a medial path A—A which will bring it into bridging engagement with the contact 121 and contact extension 120ᵃ, and into engagement with the contact extensions 123ᵃ and 124ᵃ, and the contact 125 is also manually movable laterally of such medial line to bring it into bridging engagement with the main portion of the contact 120 and the contact 121 or 122, or into engagement with the main portion of the contact 123 or 124. The controlling contact 125 is carried by a sleeve 126, this sleeve fitting loosely over an inner sleeve 127 of "Bakelite" or other suitable electrical insulating material, the sleeve 127 being mounted loosely on a shaft 128 which is journalled in suitable bearings in the casing 116. The contact 125 is mounted yieldingly on an extension 129 projecting from one side of the sleeve 126, it being pressed into engagement with the cooperating contacts of the switch by a spring 130, the contact 125 being connected by a coiled or other flexible conductor 131 to a terminal 132 on the switch casing, and the sleeve 126 has an extension 133 projecting radially from its opposite side and in which the stem of a handle 134 is fitted to reciprocate. The inner end of the stem of this handle is provided with a projection 135 which is engageable in a groove 136 which is formed circumferentially in the inner sleeve 127, and it is yieldingly held in engagement with said groove by a spring 137, it being disengageable however from the groove 136 by pulling upwardly on the handle 134 against the action of the spring 137. The sleeve 127 has a swivel or other suitable connection 138 to a speed responsive device. This speed responsive device in its preferred form and as shown in the present instance comprises a disk 139 which is slidable longitudinally on the shaft 128 and has the sleeve 127 coupled thereto, the disk 139 having a pair of arms 140 pivoted thereto at 141, these arms carrying weights 142 adapted to be thrown outwardly by centrifugal force due to rotation of the speed responsive device, and the weight at each side of the shaft 128 is connected to one arm 143 of a coiled spring 144, the other arm of each coiled spring being secured to the hub of a disk 145 which is pinned or otherwise fixed to the shaft 128 and has diametrically opposite radial slots 146 therein in which the respective arms 140 are movable radially, it being noted that the weight 142 on each side of the shaft 128 is connected to an arm of the spring at the opposite side of such shaft so that as the weights swing outwardly under centrifugal force due to rotation thereof, the arms 143 of these springs will swing about the coiled intermediate portions thereof as centers, thereby causing the weights and the arms 140 to shift longitudinally of the shaft 128, thereby shifting the disk 139 and sleeve 127 longitudinally on said shaft. The shaft 128 may be driven from the automobile by bevel gearing 148 which may be connected to a flexible or other shaft 149 such as that commonly employed to drive the ordinary speedometer on an automobile, so that the speed responsive device will be driven at a speed corresponding to that of the automobile.

In employing a selecting switch constructed as just described, the contact 125 will be advanced in relation to its cooperating contact automatically according to the speed of the automobile while the projection 135 is engaged in the groove 136. However, by retracting the handle 134 and thereby disengaging the projection 135 from the groove 136, the switch contact 125 may be shifted manually or at the will of the driver independently of the speed responsive device, since the sleeve 126 which carries the contact 125 will then be movable freely longitudinally on the sleeve 127; or, the switch contact 125 can be shifted manually or at the will of the driver while the projection 135 is engaged in the groove 136, by applying sufficient force to the switch handle 134 to overcome the action of the speed responsive device and thereby bring the contact 125 into engagement with one or another of the cooperating contacts of the switch.

In order to enable the selecting switch to be retained in any set position after being brought into such position manually by manipulation of the handle 134, the casing 116 is provided with a slot 150 in which the handle 134 operates. This slot has an enlarged portion 151 in which the stem of the handle may operate while swung laterally to engage the main portion of either of the contacts 123 or 124, and it has lateral notches 152 in which it may be engaged when the contact 125 is swung laterally into engagement with the contact 120 and the contact 121 or 122. This slot also has a lateral notch 153 in which the stem of the handle 134 may be engaged when the contact 125 has been brought into engagement with the insulating block 119 and has been swung laterally. When the switch is set for operation automatically by the speed responsive device, the stem of the handle 134 is set centrally of the slot 150 so that it may move longitudinally in said slot along the medial path A—A in response to the action of the speed responsive device, but when the handle 134 is operated manually to select one or another gear change at the will of the driver, it may be moved longitudinally in the slot 150 along said medial path, and it may be swung laterally into the appropriate notch in the slot to retain it in engagement with the desired contact.

The contacts of the selecting switch just described are connected to the appropriate contacts of the controlling switch to effect the different desired gear changes. As shown in Fig. 1, the contact 120 is connected by a wire 160 to the solenoid 55 which shifts the actuating member 20 to disconnect it from the shifting bar 16 and connect is to the shifting bar 14, the other terminal of this solenoid being grounded, as shown. The contact 121 is connected by a wire 161 to the contact 81, the contact 122 is connected by a wire 162 to the contact 80. The contact 123 is connected by a wire 163 to the contact 78, and the contact 124 is connected by a wire 164 to the contact 79. The terminal 132 connected to the controlling contact 125 is connected by a wire 165 to the contact 106.

The operation of a gear changing device constructed as hereinbefore described is as follows:

Assuming the switch handle 134 to be normally retained in the notch 153 of the selecting switch, at which time the contact 125 will be resting on the insulation block 119, the gear changing elements of the transmission mechanism will be in neutral condition. In order to set the device for first speed, the handle 134 is disengaged from the notch 153 and brought into a middle position and the contact 125 is caused, by the spring action of the spring arms 143, to engage the contact extension 120ᵃ and the contact 121, the contact 125 being sufficiently wide to bridge the contact 121 and the contact extension 120ᵃ. With the contact 125 set in such position, the clutch pedal is depressed or operated to disengage the driving clutch of the automobile, thereby depressing the plunger 101. The initial part of the depressing movement thus imparted to the plunger 101 will cause the dog 103 thereon to engage the switch arm 93 and depress it, bringing the contact 94 thereon into engagement with the contact 95. A circuit is then completed from the battery B through wire 110, switch arm 93, contacts 94 and 95, electro-magnet winding 90, wire 89 to contact 76, but if the transmission mechanism happens to be in neutral condition, this circuit will be open where the contact 67 rests on the insulation between contacts 72 and 73. Further depression of the plunger 101 by the clutch pedal brings the contact 104 into bridging relation with the contacts 105 and 106 and current then passes from the switch arm 93, which has returned to its raised position due to the open circuit through its winding 90, through the engaged contacts 96 and 97, contacts 104 and 106 and conductor 165 to contact 125. Since the contact 125 bridges the contact 121 and also the contact extension 120ª, current will flow from contact 125 to contact 120 thence to conductor 160 to solenoid 55, energizing the latter so that it will shift the actuating member 20 out of engagement with the shifting bar 16 and connect it with the shifting bar 14. Current will also flow from the battery through the conductor 125 to contact 121 thence through wire 161 to contact 81 which will be engaged by the contact 64 after the actuating member has been brought into engagement with the shifting bar 14, and the current will then pass from the contact 64 to the contact 75 and then by conductor 86 to the solenoid 51ª of the valve 38, thereby causing this valve to shift into a position to establish communication between the right hand side of the casing 28 and the intake manifold 36, the solenoid 51 of the valve 37 at this time being de-energized so that this valve will establish communication between the opposite end of the vane casing 28 and the atmosphere. In consequence air at atmospheric pressure entering the left hand side of the vane casing will act to swing the vane 27 into its right hand position shown in Figure 1, thereby operating the actuating member 20 to shift the bar 14 in a direction to mesh the gear 8 with the first speed gear 5. The operation of setting the transmission for reverse gear will be similar to that just described except that the handle 134 is swung laterally to bring the contact 125 into engagement with the contact 122, the contact 125 also bridging the contact 120, so that the solenoid 55 will be energized to disconnect the actuated member 20 from the shifting bar 16 and connect it to the shifting bar 14, following which current from the battery will pass from the contact 122 to the contact 80 and from the latter through the contact 63 to contact 74 and from the latter, through conductor 85 to the solenoid 51 of the valve 37, thereby energizing the solenoid of this valve and causing its piston to shift into a position to establish communication between the left hand side of the vane casing 28 and the intake manifold, the solenoid 51ª of the valve 38 being then de-energized so that this valve will establish communication between the right hand side of the vane casing 28 and the atmosphere. Atmospheric pressure will then enter the right hand side of the vane casing and swing the vane 27 toward the left in Figure 1, thereby shifting the bar 14 to bring gear 8 into mesh with the reverse gear 9.

Second speed is obtained by engagement of the contact 125 with the contact 123 and depression of the clutch pedal 100 to disengage the driving clutch. Since the contact 125 will then be out of engagement with the contact 120, the solenoids 55 will be de-energized so that the actuating member 20 will be engaged with the shifting bar 16 under the influence of the spring 31. The pressure of the clutch pedal will then depress the plunger 101, the dog 103 thereon engaging and moving the switch arm 93 downwardly to bring the contact 94 thereon into engagement with the contact 95, and current will then flow from the battery B through the conductor 110, switch arm 93, contacts 94 and 95, electro-magnet winding 90, conductor 89 to the contact 76. Assuming the transmission had been previously set for first speed, the contact 67 will then rest on the contact 72, and current will then flow from the contact 76 through contact 67, contact 72 and conductor 87 to solenoid 51 of valve 37, thereby shifting the piston of this valve into a position to establish communication between the left hand side of the vane casing 28 and the intake manifold, the solenoid of the valve 38 at this time being de-energized so that this valve will be in a position to admit air at atmospheric pressure to the right hand side of the vane casing 28. Air at atmospheric pressure will thus enter the vane casing and swing the van 27 toward the left in Figure 1 until it reaches its middle position, at which time the contact 67 passes off the contact 72, thus breaking the circuit through the solenoid 51 of the valve 37 and thereby interrupting communication of the left hand side of the casing 28 with the intake manifold and establishing communication between this side of the casing and the atmosphere, so that the swing of the vane will be thereby interrupted at its middle or neutral position, and the disengagement of the contact 67 from the contact 72 will break the circuit through the winding of the electromagnet 90, thereby releasing the switch arm 93 and allowing it to swing upwardly to engage the contact 96 thereon with the contact 97, and current from the battery B will then flow from the switch arm 93 through contacts 96 and 97, 104, 105 and 106, through conductor 165 to contact 125 thence to contact 123 and through conductor 163 to contact 78 and from the latter, through contact 63 to contact 74, and from the latter, through conductor 85 to solenoid 51 of valve 37, thereby setting the piston of this valve in position to establish communication between the left hand side of the vane casing 28 and the intake manifold, the solenoid 51ª of the valve 38 being then de-energized, so that air at atmospheric pressure may then enter the right hand side of the vane casing 28 and cause the van 27 to swing to the left hand side of its casing, thereby swinging the actuating member 20 in a direction to reciprocate the shifting bar 16 in a direction to engage the gear 10 connected thereto with the second gear 6. Third speed is obtained by engagement of the contact 125 with the contact 124. Since the contact 125 will then be out of engagement with the contact 120 the solenoid 55 will be de-energized so that the actuating member 20 will be in engagement with the shifting bar 16 under the influence of the spring 31. Depression of the plunger 101 by operation of the clutch pedal 100 to disengage the driving clutch of the automobile will then first engage and depress the switch arm 93, causing engagement of the contact 94 thereon with the contact 95 and current will then flow from the battery B through conductor 110, switch arm 93, contacts 94 and 95, electro-magnet winding 90, conductor 89 to contact 76, and assuming that the transmission mechanism was previously set for second speed, the contact 67 will then engage the contact 73, so that current will flow through the contacts 76, 67 and 73 and through conductors 86 and 88 to the solenoid 51ª of the valve 38, thereby operating the piston of this valve to establish communication between the right hand side of he vane casing 26 and the intake manifold, the solenoid 51 of the valve 37 at this time being de-energized so that this valve will establish communication between the left hand side of the vane casing 28 and the atmosphere. Air at atmospheric pressure will then enter the left hand side of the casing 28 and will cause the vane 27 to swing from that side of the casing toward the right until the contact 67 disengages from the contact 73, whereupon the circut through the solenoid 51ª will be broken and this valve will return to its normal position to establish communication between the right hand side of the casing 28 and the atmosphere, the vane 27 being thus caused to come to rest in its middle position, the shifting bar 16 being then in neutral position. The breaking of the circuit by the passing of the contact 67 from engagement with the contact 3 also breaks the circuit through the winding of the electro-magnet 90 so that the switch arm 93 then swings upwardly bringing its contact 96 into engagement with the contact 97 and current will then flow from the battery through the switch arm 93, contacts 96, 97, 104, 105, 106 and through the conductor 165 to the contact 125 and from the latter to contact 124 then through conductor 164 to contact 79, and the current passes from the latter contact through contact 74 to contact 75 thence by conductor 86 to the solenoid 51ª of the valve 38, thereby operating the piston of this valve to establish communication between the right hand side of the vane casing 28 and the intake manifold, the solenoid 51 of the valve 57 being then de-energized so that this valve will establish communication between the left hand side of the casing 28 and the atmosphere. Air at atmospheric pressure will then enter the left hand side of the casing 28 through the valve 37 and will thereby swing the vane 27 to the right hand side of the casing 28, thereby shifting the bar 16 to cause the gear 10 connected thereto to shift in a direction to engage the clutch members 11 and 12.

In order to restore the transmission mechanism to neutral, the switch handle 134 is moved into the notch 153 in the slot in the casing 116 and then depressing the clutch pedal to disengage the driving clutch. Such depression of the clutch pedal will depress the plunger 101, thereby depressing the switch arm 93 and closing a circuit through the contacts 94 and 95, winding 90, conductor 89 to contact 76, and assuming the transmission gearing had been set in third speed, in which event the contact 67 would be in engagement with the contact 72, the current then passes through contacts 76, 67 and 72 and through conductor 87 to solenoid 51 of valve 37, thereby setting this valve to establish communication between the left hand side of the vane casing and the intake manifold, the solenoid 51ª of the valve 38 being then de-energized so that this valve will establish communication between the right hand side of the vane casing and the atmosphere. Air at atmospheric pressure will then enter the right hand side of the vane casing through the valve 38 causing the vane 37 to swing toward the left in Figure 1 until the contact 67 moves out of engagement with the contact 72, whereupon the circuit through the solenoid 51ª will be broken, thereby permitting this valve to return to its normal position to establish communication between the right hand side of the casing 28 and the atmosphere, and the swing of the vane 27 will thereby be interrupted when it reaches its middle or neutral position, at which time the shifting bar 16 will be in neutral position. Since the contact 125 will then be out of engagement with the cooperating contacts of the selecting switch which control the gear changes, the transmission mechanism will be restored to neutral condition.

The gear changing operations take place as just described, whether the selecting switch is operated automatically under the influence of the speed responsive device, or whether it is operated manually at the will of the driver, it being noted that in any case the device is restored automatically to neutral condition before any gear change is made, and restoration of the transmission mechanism to neutral condition prior to any gear change is insured by the holding magnet 90 which maintains the neutralizing circuit closed and holds the gear shifting circuit open until after the mechanism has been brought to neutral condition.

Instead of shifting the actuating member 20 to disconnect it from the shifting bar 16 and connect it to the shifting bar 14 by the direct action of a solenoid, as hereinbefore described, fluid pressure operated electro-magnetically controlled means such as shown in Figure 11 may be employed. As shown in this figure the shaft 26ª connected to the actuating member 20 and corresponding to the shaft 26 previously described has a piston 175 fixed thereon, this piston being mounted to reciprocate in a fluid pressure cylinder 176, one end of which is closed by a switch like that shown in Figures 3, 4, 5 and 6, the controlling member 60 of which is fixed to the shaft 26ª, this switch being constructed and operating as already hereinbefore described. The cylinder 176 has a port 177 in a side thereof which is adapted to be connected to a pipe 178 connected to the intake manifold of the automobile engine, through a circumferential port 179 in a valve 180, this valve operating in a bore 181, the side of which has an atmospheric port 182 which is adapted to be put in communication with the cylinder by the valve 180 when the latter is in its normal position. The valve 180 has a solenoid core 183 which operates in a solenoid 184, so that when this solenoid is energized, the valve 180 will be retracted, thereby establishing communication between the pipe 178 and the port 177 through the port 179 in this valve, thereby establishing a vacuum pressure in the cylinder 176 which will cause the shaft 26ª to shift axially and thereby disconnect the actuating member 20 from its normal engagement with the shifting bar 16 and to connect it with the shifting bar 14. When the solenoid 184 is de-energized, the valve 180 will be returned to its normal position under the action of a spring 185, thereby interrupting communication of the port 177 with the pipe 178 and establishing communication between the port 177 and the atmospheric port 182, through the port 179 in the valve whereupon the spring 31 will act to return the actuating member 20 to its normally engaged relation with the shifting bar 16. The solenoid 184 employed in this embodiment of the invention may be connected in the same manner in which the solenoid 55 previously described is connected, and the fluid pressure operated device shown in Figure 11 will operate in the same manner as hereinbefore described with respect to the solenoid 55, with the exception that the shifting of the actuating member into engagement with one or the other of the shifting bars will be effected by fluid pressure under the control of the solenoid instead of being effected directly by the power of the solenoid itself.

The gear changing device provided by the present invention insures the return to neutral of any gear element of the transmission mechanism that may be in operative position, before any change is made to another gear or speed, the electromagnetically controlled switch holding the neutral restoring circuit in closed condition until the transmission mechanism has been restored to neutral condition before allowing the gear shifting circuit to be closed, thereby precluding any danger of setting a gear element in operative position before a gear element previously in operative position has been restored to neutral position. Since this switch, which completes the circuits controlling the different gear changing operations as determined by the selecting switch, is operable at the will of the driver, as by actuation of the usual clutch pedal to disengage the driving clutch of the automobile, the different gear changes will or may be pre-selected by the selecting switch but the selected gear change will not be actually made until desired by the driver.

The selecting switch provided by the present invention enables the different gear changes to be selected automatically according to the speed of the automobile, or manually and selectively at the will of the driver, by either disconnecting the controlling contact from the speed responsive device so that this contact may be brought into engagement with any one of the gear changing contacts independently of and free from the influence of the speed responsive device or by shifting the controlling contact of the selecting switch against the influence of the speed responsive device and while it remains connected thereto, the manual control thus provided placing the gear changing operations entirely under the control of the driver, as is desirable in many instances. The notched slot for the handle of the controlling contact of this switch enables it to be held in set position for any desired speed or gear change whenever desired, and it also enables this switch to be locked or held in neutral, as while the automobile is standing or is not in operation. In setting the selecting switch in neutral while the controlling contact is connected to the speed responsive device, such contact is moved beyond its normal position to engage the neutral contact, against the action of the springs of the speed responsive device, these springs being bendable or yieldable to permit such further movement of the controlling contact.

The switch connected to the actuating member to move in accordance with the movements of the actuating member, automatically controls the circuits governing the restoring of the transmission mechanism to neutral condition and the shifting of the gear changing elements to effect the different gear changes, the elements of this switch, in the preferred construction, comprising a unit which may be readily applied to the transmission mechanism or the fluid pressure or other motor employed to operate the actuating member.

It is to be understood that while the preferred embodiment of the invention is herein shown and described, obviously the invention may be carried out by employing structural elements which are equivalents of those shown, and it is to be further understood that while the invention has been shown and described as applied to an automobile transmission of the ordinary conventional form, the invention is also applicable to other types of changeable speed power transmission mechanisms. Obviously, instead of applying the invention to the shifting of gears in a transmission mechanism of the sliding gear type as shown, it may be applied to a transmission mechanism of well known type in which clutches slide or otherwise operate to effect the different gear or speed changes.

It is also to be understood that while the invention is shown and hereinbefore described as applied to the transmission mechanism for effecting different gear changes, the invention is not limited thereto, the scope of the invention being defined by the appended claims.

I claim as my invention:

1. A gear changing device for changeable speed mechanism, comprising an actuating member having means for operatively connecting it to a gear changing element of said mechanism for shifting it to effect different gear changes, power means for operating said actuating member, controlling means for said power means settable into different positions for different gear changes, a speed responsive device, means connected to said controlling means for setting said controlling means for different gear changes embodying a member having means for connecting it to said speed responsive device for operation thereby to render the controlling means operative automatically and for disconnecting it from said speed responsive device to render the controlling means operative independently thereof at the will of the operator, and means cooperative with said member to restrict the operation thereof by the speed responsive device.

2. A gear changing device for changeable speed mechanism, comprising an actuating member having means for operatively connecting it to a gear changing element of said mechanism to shift it to effect different gear changes, electromagnetically controlled means for operating said actuating member, a controlling switch having contacts connected to said electro-magnetically controlled operating means and a cooperating controlling contact, a speed responsive device, means for connecting said controlling contact to and disconnecting it from said speed responsive device to render said switch operative automatically according to speed or operative independently of said speed responsive device and at the will of the operator, and means for locking said controlling contact against movement while connected to the speed responsive device.

3. A gear changing device for changeable speed mechanism, comprising an actuating member having means for operatively connecting it to a gear changing element of said mechanism to shift it to effect different gear changes, electromagnetically controlled means for operating said actuating member, a controlling switch having contacts connected to said electro-magnetically controlled operating means and a cooperating controlling contact, a speed responsive device, means for connecting said controlling contact to and disconnecting it from said speed responsive device to render said switch operative automatically according to speed or operative independently of said speed responsive device and at the will of the operator and means for holding said controlling contact in one or another set position with respect to other contacts of the switch whether said controlling contact is connected to or disconnected from the speed responsive device.

4. A gear changing device for changeable speed mechanism having a plurality of gear changing elements each movable in opposite directions to effect different gear changes, comprising an actuating member having electro-magnetically controlled means for operatively connecting it to one or another of said gear changing elements and electro-magnetically controlled means for moving it in one or another direction, a controlling switch having pairs of contacts connected to the electro-magnetic controlling means for said operating means to determine the direction of movement of the actuating member, a supplemental contact cooperative with one pair of said contacts and connected to the electro-magnetic controlling means for said connecting means to determine the gear changing element to which the actuating member will be connected, a controlling contact engageable with one or another of said pairs of contacts and also with said supplemental contact at the will of the operator, a speed responsive device, means for connecting said controlling contact to the speed responsive device for operation automatically thereby and for disconnecting said controlling contact for operation independently thereof, and means for locking the controlling contact in engagement with one or another of the other switch contacts.

5. A gear changing device for changeable speed mechanism for automotive vehicles, comprising a rotatable fluid pressure operated actuating member operative upon said mechanism to set it for different speeds or in neutral, means mounted coaxially and rotatably with the actuating member for controlling said member to set said mechanism in neutral, and means responsive to the speed of the vehicle and rendered operative by the return of said mechanism to neutral for controlling the actuating member to effect different speed changes.

6. A gear changing device for changeable speed mechanism, comprising an actuating member operative upon said mechanism to set it for different speeds or in neutral, electro-magnetically controlled means for operating said member to set said mechanism for one or another speed change or in neutral, a switch having speed changing and neutral restoring contacts connected to the electro-magnetic controlling means for the actuating member, a controlling contact member connected to the actuating member to move therewith and engageable with said switch contacts and disengageable from the neutral restoring contacts when the actuating member returns to neutral position, a speed responsive device, means controlled by said speed responsive device for governing the supply of electrical energy to said speed changing contacts, and means for supplying electrical energy successively to the neutral restoring contacts and then to the speed changing contacts.

7. A gear changing device for changeable speed mechanism, comprising an actuating member operative upon said mechanism to set it for different speeds or in neutral, electro-magnetically controlled means for operating said member to set said mechanism for one or another speed change or in neutral, a switch having speed changing and neutral restoring contacts connected to the electro-magnetic controlling means for the actuating member, a controlling contact member connected to the actuating member to move therewith and engageable with said switch contacts and disengageable from the neutral restoring contacts when the actuating member returns to neutral position, a neutral restoring circuit connected to the neutral restoring contacts and including a solenoid-controlled switch for holding said circuit closed until the actuating member has returned to neutral position and the controlling contact disengages from the neutral restoring contacts, and another circuit connected to said speed changing contacts and having means governed by said solenoid-controlled switch for closing it when the neutral restoring circuit is opened.

8. A gear changing device for changeable speed mechanism, comprising an actuating member operative upon said mechanism to set it for different speeds or in neutral, electro-magnetically controlled means for operating said member to set said mechanism for one or another speed change or in neutral, a switch having speed changing and neutral restoring contacts connected to the electro-magnetic controlling means for the actuating member, a controlling contact member connected to the actuating member to move therewith and engageable with said switch contacts and disengageable from the neutral restoring contacts when the actuating member returns to neutral position, and an electro-magnetically-controlled switch having its winding and contacts connected in circuit with said neutral restoring contacts to energize the latter contacts while the winding of said switch is energized, and having other contacts connected to said speed changing contacts to energize the latter after said solenoid has been de-energized.

9. A gear changing device for an automobile changeable speed mechanism, comprising an actuating member movable in opposite directions and having means for connecting it to a speed changing element of said mechanism to set it for one or another speed when moved into opposite positions or to set it in neutral condition when said member is in an intermediate position, means for operating the actuating member in one or the other direction, a speed responsive device responsive to the speed of the automobile, means governed by said speed responsive device for controlling the operation of said actuating member, and means connected to the actuating member to move in accordance therewith and operative to interrupt the action of the operating means on the actuating member when the latter reaches intermediate neutral position.

10. A gear changing device for an automobile changeable speed mechanism, comprising an actuating member movable in opposite directions and having means for connecting it to a speed changing element of said mechanism to set it for one or another speed when moved into opposite positions or to set it in neutral condition when said member is in an intermediate position, electro-magnetically controlled means for operating the actuating member, a switch having speed changing and neutral restoring contacts connected to the electro-magnetic controlling means for the actuating member and having a controlling contact member connected to the actuating member to move therewith and cooperative with said contacts, said controlling contact member being disengaged from said neutral restoring contacts when the actuating member is in intermediate neutral position, a speed responsive device responsive to the speed of the automobile, and means governed by said speed responsive device and connected to said speed changing contacts for controlling the speed changing operation of said actuating member.

11. A gear changing device for changeable speed mechanism, comprising an actuating member movable in opposite directions and having means for connecting it to a speed changing element of said mechanism to set it for one or another speed when moved into opposite positions or to set it in neutral condition when said member is in an intermediate position, electromagnetically-controlled means for operating the actuating member, a switch having contacts connected to the electro-magnetic controlling means for the actuating member and a controlling contact member connected to the actuating member to move therewith and having neutral restoring and speed changing contacts thereon, the neutral restoring contacts being in circuit-closing condition while the actuating member is in position for one or another speed and moving into circuit-opening condition when the actuating member assumes an intermediate position, a speed responsive device, and means governed by said speed responsive device and connected to said speed changing contacts for controlling the speed changing operation of said actuating member.

12. A gear changing device for changeable speed mechanism having a plurality of shiftable gear changing elements, comprising a rotatable actuating member, shiftable axially to connect it to one or another of said elements and rotatable in one or the other direction to shift such element to effect one or another gear change, electro-magnetically controlled means for operating the actuating member, an electric switch embodying a controlling member connected to the actuating member to rotate and shift axially therewith and carrying neutralizing and gear changing contacts, and other contacts connected to said electro-magnetic controlling means for the actuating member and engageable by the contacts on the controlling member according to the axial and rotative positions thereof, the neutralizing contact on the controlling member being disengaged from the cooperative contacts when the actuating member is rotated into an intermediate position.

13. A gear changing device for changeable speed mechanism comprising a rotatable fluid pressure operated actuating member having a shaft connected thereto, electro-magnetically controlled valves controlling the operation of the actuating member in either of two directions to effect different gear changes, a switch mounted concentrically of said shaft and having a controlling contact member fixed to said shaft to rotate therewith, and contacts connected to the electro-magnetic controlling means for said valves and engageable by the contacts of the controlling contact member.

14. A gear changing device for changeable speed mechanism having a plurality of shiftable gear changing elements, comprising a rotatable fluid pressure operated actuating member, a shaft connected to rotate with said member and shiftable axially to connect said member to one or another of said elements to effect different gear changes, electro-magnetically controlled valves controlling the operation of the actuating member, a selecting switch having contacts corresponding with different gear changes and a controlling contact settable into engagement with one or another of said contacts, a second switch mounted concentrically of the shaft of the actuating member and having valve controlling contacts connected to the electro-magnetic controlling means for said valves and other contacts connected to the respective contacts of the selecting switch, and a controlling contact member fixed to said shaft to rotate and shift axially therewith and carrying contacts engageable with said valve controlling contacts and with one or another of said other contacts according to the direction in which the shaft is shifted axially.

15. A gear changing device for changeable speed mechanism having a plurality of shiftable gear changing elements, comprising a rotatable fluid pressure operated actuting member, a shaft connected to rotate with said member and shiftable axially to connect said member to one or another of said elements to effect different gear changes, electro-magnetically controlled valves controlling the operation of the actuating member, a selecting switch having contacts corresponding with different gear changes and a controlling contact settable into engagement with one or another of said contacts, a second switch mounted concentrically of the shaft of the actuating member and having peripheral contacts connected to the electro-magnetic controlling means for said valves and end contacts connected respectively to the contacts of the selecting switch, and having a controlling contact member connected to said shaft to rotate and shift axially therewith, said controlling contact member having contacts thereon engageable with said peripheral contacts and with one or another of said end contacts according to the direction in which said shaft is shifted axially.

16. A gear changing device for changeable speed mechanism having a plurality of shiftable gear changing elements, comprising a rotatable fluid pressure operated actuating member, a shaft connected to rotate with said member and shiftable axially to connect said member to one or another of said elemenas to effect different gear changes, electro-magnetically controlled valves controlling the operation of the actuating member, a selecting switch having contacts corresponding with different gear changes and a controlling contact settable into engagement with one or another of said contacts, a second switch mounted concentrically of the shaft of the actuating member and having peripheral contacts connected to the electro-magnetic controlling means for said valves and end contacts connected respectively to the contacts of the selecting switch, and having a controlling contact member connected to said shaft to rotate and shift axially therewith, said contact member carrying a contact engageable with one or another of the peripheral contacts while the actuating member is in one of its gear changing positions and disengageable with such contact when the actuating member is in neutral position, said controlling contact member also carrying other contacts engageable with said peripheral contacts and with one or another of the end contacts according to the direction in which said shaft is shifted axially.

17. A gear changing device for changeable speed mechanism having a plurality of shiftable gear changing elements, comprising a rotatable fluid pressure operated actuating member, a shaft connected to rotate with said member and shiftable axially to connect said member to one or another of said elements to effect different gear changes, electro-magnetically controlled valves controlling the operation of the actuating member, a selecting switch having contacts corresponding with different gear changes and a controlling contact settable into engagement with one or another of said contacts, a second switch mounted concentrically of the shaft of the actuating member and having peripheral contacts connected to the electro-magnetic controlling means for said valves and end contacts connected respectively to the contacts of the selecting switch, and having a controlling contact member connected to said shaft to rotate and shift axially therewith, said contact member carrying a neutralizing contact engageable with one or another of the peripheral contacts while the actuating member is in one of the gear changing positions and disengageable therefrom when the actuating member is in an intermediate neutral position, said controlling contact member also carrying other contacts engageable with said peripheral contacts and with one or another of said end contacts according to the direction in which said shaft is shifted axially, a neutralizing circuit connected to the neutralizing contact of said switch and embodying means for maintaining it closed until said neutralizing contact disengages from one or another of the peripheral contacts, and means governed by the opening of the neutralizing circuit for supplying energy to one or another of said end contacts and the other contacts of said controlling contact member to effect a gear change.

18. A gear changing device for a changeable speed mechanism having a pair of shiftable gear changing elements, comprising a fluid pressure operated actuating member, electro-magnetically controlled valves controlling the operation of the actuating member, a shaft connected to the actuating member to rotate therewith and shiftable axially to connect it to one or the other of the gear changing elements, a spring acting on said shaft to normally hold the actuating member in connected relation with one of said elements, a solenoid mounted coaxially of said shaft and operative, when energized, to connect the actuating member to the other gear changing element, a switch also mounted coaxially of said shaft and embodying contacts connected to the electro-magnetic controlling means for said valves and a controlling contact member connected to said shaft to rotate and shift axially therewith and carrying contacts cooperative with the contacts connected to said electro-magnetic valve controlling means, and a selecting switch having contacts connected to the contacts of the first mentioned switch and having a supplemental contact connected to said solenoid, and a cooperative controlling switch member.

19. In a device of the class described, the combination of an element to be operated, a rotatable piston for actuating it, electro-magnetically controlled valve means controlling said piston, and a rotatable switch mounted coaxially with and connected to said piston and having contacts connected to the electro-magnetic controlling means for the valve means and governed in its rotation to control its contacts in accordance with the position of said piston for causing the piston to be restored automatically to a predetermined position.

20. In a device of the class described, the combination of a rotatable element to be operated, a rotatable piston mounted coaxially with said element for actuating it, electro-magnetically controlled valve means controlling said piston, and a rotatable switch mounted coaxially with and connected to said element and piston and having contacts connected to the electro-magnetic controlling means for the valve means and controlled in its rotation to control its contacts by the movement of said piston for causing the movement of the piston to be interrupted when it reaches a predetermined position.

21. In a device of the class described, the combination of an element to be operated, and actuating means therefor comprising as a unit a casing, a fluid pressure operative member rotatable therein for actuating said element, and a rotatable switch mounted coaxially with said fluid pressure operative member and having a fluid pressure operative member for rotation in coordination with the rotative movements thereof, and electro-magnetically controlled valve means controlling said fluid pressure operative member, the electro-magnetic controlling means for said valve means being connected to said switch for control thereby.

22. In a device of the class described, the combination of an element to be operated, and actuating means therefor comprising as a unit a casing, a fluid pressure operative member rotatably mounted therein for actuating said element, and electro-magnetically controlled valves mounted on said casing for controlling said fluid pressure operative member, and a switch connected to the electro-magnetic controlling means for said valve means and having a rotatable controlling member mounted coaxially with and connected to the fluid pressure operative member for rotation in coordination therewith.

23. In a device of the class described, the combination of a plurality of elements to be reciprocated, a rotatable and axially movable actuating member having means for operatively connecting it to one or another of said elements to shift it in one or another direction, and operating and controlling means for the actuating member comprising a fluid pressure operative piston connected to the actuating member, a switch having a controlling contact member connected to the actuating member to rotate and move axially therewith and movable axially into one or another position according to the element to which the actuating member is connected and having different sets of contacts one or another of which sets is rendered operative according to the axial position of the controlling contact member of the switch, and electro-magnetically controlled valve means for controlling the piston, the electro-magnetic controlling means for the valve means being connected to one or another of said sets of contacts of the switch according to the axial position occupied by the controlling contact member thereof.

24. In a device of the class described, the combination of a plurality of elements to be reciprocated, a rotatable and axially movable actuating member having means for operatively connecting it to one or another of said elements to shift it in one or another direction, and operating and controlling means for the actuating member comprising as a unit a casing, a piston operative therein and connected to the actuating member, and a switch mounted on said casing coaxially with said actuating member and having a controlling contact member connected to the actuating member to rotate and move axially therewith and movable axially into one or another position according to the element to which the actuating member is connected and having sets of contacts, said controlling member being cooperative with one or another of said sets of contacts according to the axial position of said controlling contact member and cooperating with the contacts of one or the other of said sets when rotated, and electro-magnetically controlled valve means for controlling the piston, the electro-magnetic controlling means for the valve means being connected to one or another of said sets of contacts according to the axial position occupied by the controlling contact member.

25. In a device of the class described, the combination of a plurality of elements to be reciprocated, an actuating member having means for connecting it to one or another of said elements for operation thereof in one or another direction, and operating and controlling means for the actuating member comprising a fluid pressure operative member connected to the actuating member for operating it, a switch having a controlling contact member connected to said fluid pressure operative member and controlled according to the position thereof and also connected to the actuating member and movable into one or another position according to the element to which the actuating member is connected, said switch embodying sets of contacts with one or another of which the controlling member is cooperative according to the position of said controlling member, and electro-magnetically controlled valve means for controlling said fluid pressure operative member, the electro-magnetic controlling means for the valve means being connected to one or another of said sets of contacts according to the position occupied by the controlling contact member.

26. In a device of the class described, the combination of a plurality of gear changing elements to be reciprocated, an actuating member having means for connecting it to one or another of said elements for operation thereof in one or another direction and restoring thereof to inoperative positions, and operating and controlling means for the actuating member comprising as a unit a casing, a fluid pressure operative member therein connected to the actuating member for operating it, controlling valves for said fluid pressure operative member mounted on said casing and having electro-magnetic controlling means, and means including a switch comprising as a single unit, gear changing contacts and separate neutral restoring contacts connected to the electro-magnetic controlling means for the valves for controlling the direction and extent of operation of said elements and the restoring thereof to inoperative positions and a cooperating rotatable controlling contact member common to said contacts and controlled by said fluid pressure operative member.

27. In a device of the class described, the combination of a plurality of gear changing elements to be reciprocated in one or the other direction and restored to inoperative neutral positions, an actuating member having means for connecting it to one or another of said elements for operation thereof, selecting means for controlling the operations of said controlling member, and operating and controlling means for the actuating member comprising as a unit a casing, a fluid pressure operative member therein connected to the actuating member for operating it, and a switch mounted on said casing and comprising as a single unit a rotatable controlling member controlled according to the position of said fluid pressure operative member and cooperative gear changing contacts and separate neutral restoring contacts to which said controlling member is common, and valve means controlling said fluid pressure operative member and having electro-magnetic controlling means connected to the cooperative contacts of the switch and controlled by said selecting means and said controlling member for controlling the direction and extent of operation of said elements and the restoring thereof to inoperative positions.

28. A gear changing device for changeable speed mechanism having a plurality of shiftable gear changing elements, comprising a fluid pressure operated actuating member rotatable to actuate said elements to effect different gear changes, a shaft connected to rotate with said member and shiftable axially to connect said member to one or another of said elements for different gear changes, a selecting device having a controlling member settable into different positions to effect different gear changes, a controlling device mounted concentrically of the actuating member and having a controlling member connected to said shaft to rotate and shift axially therewith, and means governed by the controlling member of said controlling device and by the selecting device for controlling the movements of the actuating member.

29. A gear changing device for changeable speed mechanism having a plurality of shiftable gear changing elements, comprising a fluid pressure operated actuating member rotatable to actuate said elements to effect different gear changes, a shaft connected to rotate with said member and shiftable axially to connect said member to one or another of said elements for different gear changes, a selecting device having energy distributing elements corresponding with different gear changes and a controlling member settable into cooperate relation with one or another of said energy distributing elements, a controlling device mounted concentrically of the shaft of the actuating member and having peripheral energy distributing elements for controlling the operation of the actuating member and end energy distributing elements connected respectively to the energy distributing elements of the selecting device and having a controlling member connected to said shaft to rotate and shift axially therewith, said controlling member of the controlling device having energy distributing elements thereon cooperable with said peripheral energy distributing elements and with one or another of said end energy distributing elements according to the direction in which said shaft is shifted axially.

30. A gear changing device for an automobile changeable speed mechanism having a shiftable gear changing element movable in opposite directions to effect different gear changes and into an intermediate position to set said element in neutral, comprising an actuating member, electro-magnetically controlled means for operating said member to effect different gear changes, a switch controlled by the movement of said actuating member and having contacts connected to said electro-magnetically controlled means for setting the actuating member in intermediate neutral position, a speed responsive device responsive to the speed of the automobile, and means controllable automatically by said speed responsive device and also controllable manually independently of the speed responsive device and connected to said electro-magnetically controlled means for controlling said electro-magnetically controlled means to effect different gear changes.

31. A gear changing device for changeable speed mechanism having a plurality of shiftable gear changing elements, comprising a fluid pressure operated actuating member rotatable to actuate said elements to effect different gear changes, a shaft connected to rotate with said member and shiftable axially to connect said member to one or another of said elements for different gear changes, a speed responsive device, a selecting device having a controlling member settable by said speed responsive device and also independently thereof into different positions to effect different gear changes, a controlling device mounted concentrically of the actuating member and having a controlling member connected to said shaft to rotate and shift axially therewith, and means governed by the controlling member of said controlling device and by the selecting device for controlling the movements of the actuating member.

32. A gear changing device for changeable speed mechanism having a plurality of shiftable gear changing elements, comprising a fluid pressure operated actuating member rotatable to actuate said elements to effect different gear changes, a shaft connected to rotate with said member and shiftable axially to connect said member to one or another of said elements for different gear changes, a speed responsive device, a selecting device having energy distributing elements corresponding with different gear changes and a controlling member settable by said speed responsive device and also independently thereof into cooperative relation with one or another of said energy distributing elements, a controlling device mounted concentrically of the shaft of the actuating member and having peripheral energy distributing elements for controlling the operation of the actuating member and end energy distributing elements connected respectively to the energy distributing elements of the selecting device and having a controlling member connected to said shaft to rotate and shift axially therewith, said controlling member of the controlling device having energy distributing elements thereon cooperable with said peripheral energy distributing elements and with one or another of said end energy distributing elements according to the direction in which said shaft is shifted axially.

33. A gear changing device for an automobile transmission mechanism having a plurality of gear changing elements, comprising an actuating member having electro-magnetically controlled means for operatively connecting it to one or another of said elements and electro-magnetically controlled means for controlling its movement to operate such gear changing elements to effect different gear changes and to set said mechanism in neutral, a selecting switch for controlling said actuating member having a contact connected to the electro-magnetic controlling means for said connecting means to determine the gear changing element to which the actuating member will be connected and having other contacts and means for connecting them to the electro-magnetic controlling means for said operating means for controlling the gear changing movements of said actuating member, speed responsive means connected to said switch for setting the latter for different gear changes automatically according to speed, means operable independently of said speed responsive means for setting said switch manually, and a governing switch operative by said actuating member in coordination with the movements thereof and connected to the electro-magnetic controlling means for said operating means for causing the actuating member to set the mechanism in neutral.

34. A gear changing device for an automobile transmission mechanism having a plurality of gear changing elements, comprising an actuating member having electro-magnetically controlled means for operatively connecting it to one or another of said elements and electro-magnetically controlled means for controlling its movement to operate such gear changing elements to effect different gear changes and to set said mechanism in neutral, a selecting switch for controlling said actuating member having a contact connected to the electro-magnetic controlling means for said connecting means to determine the gear changing element to which the actuating member will be connected and having other contacts and means for connecting them to the electro-magnetic controlling means for said operating means for controlling the gear changing movements of said actuating member, speed responsive means connected to said switch for setting the latter for different gear changes automatically according to speed, means operable independently of said speed responsive means for setting said switch manually, a governing switch operative by said actuating member in coordination with the movements thereof and connected to the electro-magnetic controlling means for said operating means for causing the actuating member to set the mechanism in neutral, and means controlled by said governing switch and operable to energize said governing switch to neutralize the mechanism and to thereafter energize said selecting switch to render it operative to set the device to effect different gear changes.

35. A gear changing device for an automobile transmission mechanism having a plurality of gear changing elements, comprising an actuating member having electro-magnetically controlled means for operatively connecting it to one or another of said elements and electro-magnetically controlled means for controlling its movement to operate such gear changing elements to effect different gear changes and to set said mechanism in neutral, a selecting switch for controlling said actuating member having a contact connected to the electro-magnetic controlling means for said connecting means to determine the gear changing element to which the actuating member will be connected and having other contacts and means for connecting them to the electro-magnetic controlling means for said operating means for controlling the gear changing movements of said actuating member, speed responsive means connected to said switch for setting the latter for different gear changes automatically according to speed, means operable independently of said speed responsive means for setting said switch manually, a governing switch operative by said actuating member in coordination with the movements thereof and connected to the electro-magnetic controlling means for said operating means for causing the actuating member to set the mechanism in neutral, and clutch-actuated means for controlling the gear changing operation of the actuating member as selected by said selecting switch.

36. A gear changing device for an automobile transmission mechanism having a plurality of gear changing elements, comprising a single fluid pressure operated actuating member for said gear changing elements, electro-magnetically controlled valve means controlling the movements of said member to effect different gear changes and to set said mechanism in neutral, electromagnetically controlled means for operatively connecting the actuating member to one or another of the gear changing elements, a selecting switch having contacts connected to the electromagnetically controlled means for said valve means and the electro-magnetically controlled means for said connecting means, and a controlling member common to said contacts and operable at will to control the movements of the actuating member and its connection to one or another of the gear changing elements, speed responsive means connected to said controlling member of the selecting switch for setting it for different gear changes automatically according to speed, a governing switch connected to the actuating member for operation in coordination with the movements thereof and connected to the electro-magnetic controlling means for said valve means and to said selecting switch for causing the actuating member to set said mechanism in neutral and then render the selecting switch operative with respect to said valve means to effect different gear changes, and means including a switch controlled by said governing switch and operative to successively energize said governing and selecting switches to first set said mechanism in neutral and to subsequently render the selecting switch operative to set the device to effect different gear changes.

37. Speed ratio changing means for a variable speed automobile transmission mechanism having speed ratio changing elements, comprising actuating mechanism differently operative upon said elements to effect different speed ratio changes, speed responsive means responsive to the speed of the automobile for automatically controlling said actuating mechanism, and means operable free of the influence of the speed responsive means for manually selecting any speed ratio changing operation of said actuating mechanism independently of said speed responsive means or operable at will to restrain speed ratio changing action of the speed responsive means upon said actuating mechanism for selecting a speed ratio change.

38. A gear changing device for changeable speed transmission mechanism having a plurality of gear changing elements each movable in opposite directions to effect different gear changes, comprising a rotatable shaft having an actuating member fixed thereon to rotate coaxially therewith and having means for operatively connecting it to one another of said gear changing elements, operating means for rotating said actuating member in one or the other direction to actuate the element to which it is connected to effect one or another gear change and to restore the mechanism to neutral, selecting means including a controlling member located exteriorly of and remote from the transmission mechanism for controlling the gear changing operations of said actuating member, and controlling means for said actuating member comprising a single unit including a rotatable member located exteriorly of the transmission mechanism and connected to said shaft for rotation thereby and operative in conjunction with said selecting means and by rotation of said shaft to control the direction and extent of movement of a gear changing element by said actuating member in one or another direction to effect a gear change and to restore the mechanism to neutral.

39. A gear changing device for an automobile changeable speed transmission mechanism having a plurality of gear changing elements each movable in opposite directions to effect different gear changes and having a clutch for connecting said mechanism to the automobile engine, comprising a rotatable shaft having an actuating member fixed thereon to rotate coaxially therewith, means for operatively connecting said actuating member to one or another of said gear changing elements, operating means for rotating said actuating member to effect one or another gear change and to restore the mechanism to neutral, selecting means including a controlling member located exteriorly of and remote from the transmission mechanism for controlling the gear changing operations of said actuating member, means dependent upon the disengagement of said clutch for governing the operation of said operating means, and controlling means for said actuating member comprising a single unit including a rotatable member located exteriorly of the transmission mechanism and connected to said shaft for rotation thereby and operative in conjunction with said selecting means and by rotation of said shaft to control the direction and extent of movement of a gear changing element by said actuating member to effect one or another gear change and to restore the mechanism to neutral.

40. A gear changing device for changeable speed transmission mechanism having a plurality of gear changing elements each movable in opposite directions to effect different gear changes, comprising a rotatable shaft having an actuating member fixed thereon interiorly of the transmission mechanism to rotate coaxially with said shaft and having means for operatively connecting it to one or another of said gear changing elements, operating means for rotating said actuating member in one or the other direction to actuate the element to which it is connected to effect one or another gear change and to restore the mechanism to neutral, selecting means including a controlling member located exteriorly of and remote from the transmission mechanism for controlling the direction of movement of said actuating member and the connection of said actuating member to one or another gear changing element, and controlling means for said actuating member comprising a single unit including a rotatable member located exteriorly of the transmission mechanism and connected to said shaft for rotation thereby and operative in conjunction with said selecting means and by rotation of said shaft to control the direction of movement of said actuating member to effect one or another gear change and to restore the mechanism to neutral.

41. A gear changing device for an automobile changeable speed transmission mechanism having a plurality of gear changing elements each movable in opposite directions to effect different gear changes and having a clutch for connecting said mechanism to the automobile engine, comprising a rotatable shaft having an actuating member fixed thereon interiorly of the transmission mechanism to rotate coaxially with said shaft, means for operatively connecting said actuating member to one or another of said gear changing elements, operating means for rotating said actuating member to effect one or another gear change and to restore the mechanism to neutral, selecting means including a controlling member located exteriorly of and remote from the transmission mechanism for controlling the direction of movement of said actuating member and the connection of said actuating member to one or another gear changing element, controlling means for said actuating member comprising a single unit including a rotatable member located exteriorly of the transmission mechanism and connected to said shaft for rotation thereby and operative in conjunction with said selecting means and by rotation of said shaft to control the direction of movement of said actuating member to effect one or another gear change and to interrupt the movement of said actuating member when said actuating member reaches a neutral position, and means controlled by the disengagement of said clutch for rendering operative said selecting means and said means for controlling the direction of movement and for interrupting the movement of said actuating member.

42. In a gear changing device for changeable speed mechanism having a plurality of speed changing elements, the combination of a rotatably mounted actuating member selectively engageable with said elements and rotatable in opposite directions to effect different gear changes, electro-magnetically controlled means for rotating said member to effect such gear changes, and a switch embodying as a single unit a controlling member mounted to rotate with the actuating member and having contacts thereon, and means including cooperative gear changing contacts and separate neutral restoring contacts connected to the electro-magnetic controlling means for the actuating member, said controlling member being common to said gear changing and neutral restoring contacts and controlling the direction and extent of movement of the actuating member in one or another direction to effect different gear changes and to restore the mechanism to neutral.

43. In a device of the class described, the combination of a gear changing element to be operated, a fluid pressure operated member for actuating it in one or another direction and for restoring it to neutral position, electro-magnetically controlled valve means controlling said fluid pressure operated member, and controlling means for said fluid pressure operated member including a rotatable switch constructed as a single unit and comprising a controlling member and cooperative gear changing contacts and separate neutral restoring contacts to which said controlling member is common and connected to the electro-magnetic controlling means for the valve means to control said valve means in accordance with the position of said fluid pressure operated member and thereby control the direction and extent of movement of said fluid pressure operated member and the restoring thereof to neutral position.

EDWARD J. THURBER.